United States Patent
Rohs et al.

(10) Patent No.: US 6,171,193 B1
(45) Date of Patent: Jan. 9, 2001

(54) TORSIONAL VIBRATION DAMPER

(75) Inventors: Ulrich Rohs; Hans Rohs, both of Düren; Dietmar Heidingsfeld, Aachen, all of (DE)

(73) Assignee: Rohs-Voigt Patentverwertungsgesellschaft mbH, Düren (DE)

( * ) Notice: Under 35 U.S.C. 154(b), the term of this patent shall be extended for 0 days.

(21) Appl. No.: 09/218,478

(22) Filed: Dec. 22, 1998

(30) Foreign Application Priority Data

| Dec. 23, 1997 | (DE) | 197 57 562 |
| Dec. 23, 1997 | (DE) | 197 57 556 |
| Feb. 28, 1998 | (DE) | 198 08 560 |

(51) Int. Cl.[7] .......................................... F16D 3/68

(52) U.S. Cl. ............................ 464/68; 192/205; 192/212; 464/48

(58) Field of Search .................................. 464/66, 68, 51, 464/30, 160, 48; 192/37, 43, 212, 205, 207, 30 V, 38, 44, 72

(56) References Cited

U.S. PATENT DOCUMENTS

| 1,518,360 | * | 12/1924 | Royce | 464/66 |
| 1,820,749 | * | 8/1931 | Loeffler | 464/66 |
| 3,119,480 | * | 1/1964 | Fuchs | 464/66 |
| 4,160,390 | * | 7/1979 | Spaetgens | 74/574 |
| 4,901,831 | * | 2/1990 | Ito et al. | 192/38 |
| 5,624,317 | * | 4/1997 | Shierling et al. | 464/68 |
| 5,863,253 | * | 1/1999 | Rohs et al. | 464/66 |
| 6,019,683 | * | 2/2000 | Sudau | 464/68 |

* cited by examiner

*Primary Examiner*—Lynne H. Browne
*Assistant Examiner*—Kenneth Thompson
(74) *Attorney, Agent, or Firm*—Henry M. Feiereisen

(57) ABSTRACT

A torsional vibration damper includes two structural units rotatable relative to one another and linked to each other by a spring arrangement which includes at least one thrust piston. At certain angles of rotation between both structural units, the flow of force between the thrust piston of the spring arrangement and at least the secondary structural unit is realized via an outer surface area that engages the thrust piston, wherein the outer surface area is formed on a separate third structural unit which is resiliently mounted relative to the secondary structural unit.

13 Claims, 1 Drawing Sheet

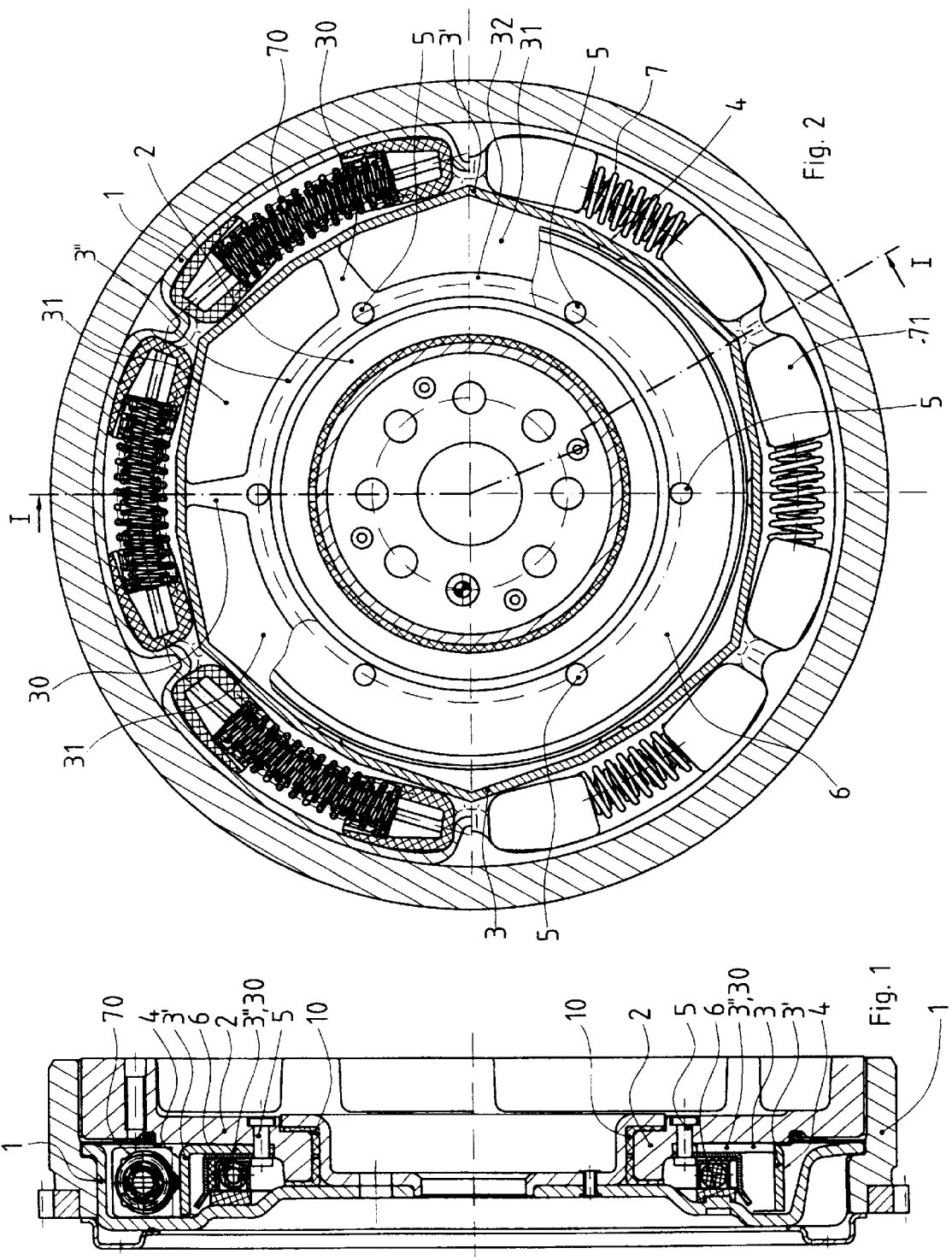

TORSIONAL VIBRATION DAMPER

CROSS-REFERENCES TO RELATED APPLICATIONS

This application claims the priorities of German Patent Applications, Serial Nos. 197 57 562.5, filed Dec. 23, 1997, 197 57 556.0, filed Dec. 23, 1997, and 198 08 560.5, filed Feb. 28, 1998, the subject matters of which are incorporated herein by reference.

BACKGROUND OF THE INVENTION

The present invention relates in general to a torsional vibration damper, and in particular to a torsional vibration damper of a type having a primary structural unit and a secondary structural unit which are rotatable relative to one another and linked to each other by a spring arrangement including at least one thrust piston, whereby the flow of force between the thrust piston of the spring arrangement and at least the secondary structural unit is realized, at least at certain angles of rotation, via an outer surface area that engages the thrust piston.

Such a torsional vibration damper is known, for example, from German Pat. No. 195 44 832 A1. In this torsional vibration damper, a driving disk overlaps a driven disk, and is formed at the inside of the overlapping part with radial pockets spaced about the periphery and having an outer surface area which extends in the direction of their peripheral ends in a slightly wedged-shaped manner toward the driving disk. The outer surface area of the driving disk has a polygonal cross section, and the pockets of the driving disk accommodate pairs of wedge-shaped thrust pistons separated from each other by compression springs. Therefore, the force flows from the driving disk via the thrust pistons and their compression springs to the polygonal outer surface area of the driven disk.

SUMMARY OF THE INVENTION

It is thus an object of the present invention to provide an improved torsional vibration damper exhibiting a characteristic which can be better adjusted.

This object, and others which will become apparent hereinafter, are attained in accordance with the present invention by forming the outer surface area on a separate third structural unit which is resiliently connected with the secondary structural unit. In particular, the separate structural unit can be resiliently connected with the secondary structural unit in a peripheral direction.

Such an arrangement advantageously provides for an additional decoupling between the primary and secondary structural units. In particular, the resiliency between the separate third structural unit and the secondary structural unit can be tailored to desired conditions, so that the spring characteristic of the torsional vibration damper according to the invention can be varied to a greater extent and suited to the desired requirements in comparison to conventional torsional vibration dampers. It is to be understood that the present invention can be equipped with all known damping means usable for torsional vibration dampers, such as friction or sliding rings and the like, so that in analogous manner the characteristic of the torsional vibration damper can also be appropriately varied and adjusted.

Persons skilled in the art will understand that the direction of the flow of force is less relevant in conjunction with a torsion vibration damper according to the present invention. Thus, the secondary structural unit can be the driving component as well as the driven component. If the secondary structural unit is configured as the driven component, the present invention can be applied directly in conventional torsional vibration dampers. In particular, the secondary structural unit can be configured as a coupling flange or be connected with a coupling flange.

In particular when using the torsional vibration damper in conjunction with a coupling, the separate third structural unit realizes an advantageously increased heat insulation between the two structural units.

Persons skilled in the art will appreciate that the present invention should not be limited to polygonal outer surface areas. Rather, all outer surface areas can be advantageously considered, when being so configured as to reduce a distance extending between the primary and secondary structural units perpendicular to the direction of rotation when both structural units are rotated relative to each other, with this gap reduction resulting in a compression of a spring arrangement. It will also be appreciated that the present invention includes the application of any spring arrangement, in particular any resilient material and shape, can be advantageously be utilized.

A resilient connection of the separate third structural unit can be realized in a particularly simple, yet sufficiently stable manner by providing the separate structural unit with an essentially L-shaped cross section, with one member encompassing the outer surface area, while the other member is secured to the secondary structural unit. The separate structural unit and the secondary structural unit can be attached or secured using all suitable attachment means, e.g. screws or rivets, or attachment types, such as welds, bonds and the like. In particular, it is advantageous to secure the separate structural unit to the outer end of the other member of the L-shaped third structural unit. In this way, the other member can be used as a resilient component between the outer surface area and the area of attachment or secondary structural unit.

According to yet another feature of the present invention, the separate third structural unit has a weak material zone between the area of attachment to the secondary structural unit and the outer surface area. Any weak point suitable for changing the resilient properties of the secondary structural unit in an appropriate manner can be used for this purpose. Abrading of material or formation of a recess are particularly suitable for providing such a weak point. Such an arrangement permits an especially simple fabrication of the separate structural unit according to the invention, since it can be manufactured in one piece. The provision of a separate structural unit with a suitable weak point for modifying the resilient properties of the separate structural unit is an essential feature of the present invention, and is applicable to other torsional vibration dampers, in particular to torsional vibration dampers in which the flow of force is not realized by a polygonal outer surface area.

An essentially annular configuration of the separate structural unit provides a high stability. Advantageously, this annular shape is suited to the polygonal outer surface area. In particular, the ring may include one member which forms the essentially polygonal outer surface area and another member which is secured to the secondary structural unit, whereby at least one recess is formed between the outer surface area and the area of attachment to the secondary structural unit. This recess is used as a weak point, and the member secured to the secondary structural unit can serve as a spring element. A right-angled arrangement of these two members is advantageous because of the resultant stability.

On the other hand, the present invention can also be realized in such a way as to connect the essentially polygonal outer surface area with the secondary structural unit via at least one web. In this configuration, the web serves as the spring element according to the invention. Also, in this case, the web projects out substantially perpendicular from the outer surface area.

The outer surface area can extend essentially parallel to the axis of rotation, and the web can extend in essentially radial direction, to thereby effect especially favorable force-related conditions for the torsional vibration damper according to the invention, in the event very slight axial forces are encountered in the torsional vibration damper as a consequence of the radial surface component.

A particularly simple way of fabricating the separate third structural unit is to form the outer surface area on a ring which is connected in one piece with the web. Certainly, also several webs can be provided. In particular, it is advantageous to correspond the number and arrangement of these webs to the shape of the outer surface area, since this ensures a uniform distribution of forces, and hence a higher overall stability of the arrangement according to the invention.

The weak points, members, webs and fastening means, such as screws, rivets, or types of point attachment, involved here in accordance with the present invention, also advantageously reduce heat transmission between the primary and secondary structural units that rotate relative to one another. For this reason, it is particularly advantageous to use a torsional vibration damper according to the invention in conjunction with couplings.

BRIEF DESCRIPTION OF THE DRAWING

The above and other objects, features and advantages of the present invention will now be described in more detail with reference to the accompanying drawing, in which:

FIG. 1 is a sectional view of a torsional oscillation damper in accordance with the present invention, taken along the I—I in FIG. 2; and FIG. 2 is a cross-sectional view of the torsional vibration damper of FIG. 1.

DETAILED DESCRIPTION OF PREFERRED EMBODIMENTS

Throughout all the Figures, same or corresponding elements are generally indicated by same reference numerals.

Turning now to the drawing, there is shown a torsional vibration damper according to the present invention, for use in a motor vehicle and situated e.g. between the internal combustion engine and an output unit, e.g. a clutch or transmission, for attenuating vibrations caused by the internal combustion engine. The torsional vibration damper includes on the inside end a primary structural unit 1, for example in the form of a hollow disk, and on the outside end a secondary structural unit 2, for example also a disk-shaped element, whereby the primary and secondary structural units 1, 2 are supported by a bearing 10 for rotation relative to one another. A spring arrangement, generally designated by reference numeral 7 includes a plurality of tangentially arranged compression springs 70 which are positioned at a radial distance to an axis of rotation A and received in pockets of the primary structural unit 1 about is circumference so as to resiliently couple the structural unit 1 with the structural unit 2. Each of the compression springs 70 extends on opposite ends between separate thrust pistons 71.

The torsional vibration damper further includes a separate third structural unit, generally designated by reference numeral 3, which, as best seen in FIG. 2, has a polygonal outer surface area 4 by which the third structural unit 3 abuts the thrust pistons 71. This third structural unit 3 has a substantially L-shaped cross section (cf. FIG. 1), defined by a first member 3' which is formed with the polygonal outer surface area 4, and defined by a second member 3" which extends at a right angle to the first member 3', and is connected to the secondary structural unit 2 by a plurality of fasteners, such as rivets 5.

The second member 3" of the structural unit 3 is formed with a plurality of webs 30 which are spaced apart by recesses 31, and provided at a number and arrangement corresponding to the symmetry of the outer surface area 4.

As shown in particular in FIG. 2, the structural unit 3 is secured by the rivets 5 to the structural unit 2 at the outer perimeter of the second member 3", with the outer perimeter of the second member 3" being designed as a fastening ring 32 for reasons of stability.

An additional attenuation of the torsional vibration damper can be realized by incorporating a friction element 6 designed as a sliding ring.

While the invention has been illustrated and described as embodied in a torsional vibration damper, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A torsional vibration damper, comprising a primary structural unit and a secondary structural unit (1, 2) which are rotatable relative to one another and linked to each other by a spring arrangement (7) which includes at least one thrust piston (71), wherein at certain angles of rotation between both structural units, the flow of force between the thrust piston (71) of the spring arrangement and at least the secondary structural unit (2) is realized via an outer surface area that engages the thrust piston (71), said outer surface area (4) being formed on a separate third structural unit (3) which is resiliently mounted relative to the secondary structural unit (2).

2. The torsional vibration damper of claim I wherein the third structural unit (3) is resiliently mounted relative to the secondary structural unit (2) in circumferential direction.

3. The torsional vibration damper of claim 1 wherein the separate structural unit (3) has an essentially L-shaped cross section defined by a first member (3') which is formed with the outer surface area (4), and by a second member (3") which is secured to the secondary structural unit (2).

4. The torsional vibration damper of claim 3 wherein the second member (3") of the third structural unit (3) is secured to the secondary structural unit (2) at an outer end (32) of the second member (3").

5. The torsional vibration damper of claim 1 wherein the third structural unit (3) is formed with a weak point between an attachment (5) on the secondary structural unit (2) and the outer surface area (4).

6. The torsional vibration damper of claim 1 wherein the third structural unit (3) is formed essentially as a ring.

7. The torsional vibration damper of claim 6 wherein the ring includes a member (3') formed with the outer surface area (4) and a member (3") secured to the secondary structural unit (2), said ring having at least one recess (31) between the outer surface area (4) and attachment (5).

8. The torsional vibration damper of claim 1 wherein the outer surface area (4) is connected with the secondary structural unit (2) via at least one web (30).

9. The torsional vibration damper of claim 8 wherein the web (30) is extends essentially at a right angle from the outer surface area (4).

10. The torsional vibration damper of claim 8 wherein the outer surface area (4) extends essentially parallel to an axis of rotation, said web (30) extending in an essentially radial direction.

11. The torsional vibration damper of claim 8 wherein the outer surface area (4) is formed on a ring which is connected in one piece with the web (30).

12. The torsional vibration damper of claim 8, further comprising a plurality of webs (30) of a number and arrangement conforming to a shape of the outer surface area (4).

13. A torsional vibration damper, comprising:

a primary structural unit;

a secondary structural unit, said primary and secondary structural units being rotatable relative to one another;

spring means disposed tangentially between the primary structural unit and the secondary structural unit for resiliently connecting the primary structural unit with the secondary structural unit; and a third structural unit positioned between the primary and secondary structural units, said third structural unit having a polygonal outer surface area which is resiliently mounted relative to the secondary structural unit for transmitting forces between the primary and secondary structural units.

* * * * *